United States Patent
Mas Rosique et al.

(10) Patent No.: US 11,388,098 B2
(45) Date of Patent: Jul. 12, 2022

(54) METHOD OF PROVIDING NETWORK SLICE PACKET FLOW DESCRIPTORS TO A SESSION MANAGEMENT FUNCTION IN A TELECOMMUNICATION NETWORK

(71) Applicant: Telefonaktiebolaget LM Ericsson (publ), Stockholm (SE)

(72) Inventors: Maria Luisa Mas Rosique, Tres Cantos (ES); Miguel Angel Muñoz De La Torre Alonso, Madrid (ES)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 17/040,069

(22) PCT Filed: Jul. 9, 2018

(86) PCT No.: PCT/EP2018/068549
§ 371 (c)(1),
(2) Date: Sep. 22, 2020

(87) PCT Pub. No.: WO2019/201457
PCT Pub. Date: Oct. 24, 2019

(65) Prior Publication Data
US 2021/0029046 A1   Jan. 28, 2021

(30) Foreign Application Priority Data

Apr. 16, 2018   (EP) .................................... 18382254

(51) Int. Cl.
*G01R 31/08* (2020.01)
*H04L 47/2441* (2022.01)
(Continued)

(52) U.S. Cl.
CPC ...... *H04L 47/2441* (2013.01); *H04L 12/1407* (2013.01); *H04L 67/14* (2013.01); *H04W 48/18* (2013.01); *H04W 76/12* (2018.02)

(58) Field of Classification Search
None
See application file for complete search history.

(56) References Cited

U.S. PATENT DOCUMENTS

2017/0332282 A1* 11/2017 Dao ..................... H04L 1/0026
2018/0069798 A1* 3/2018 Bacik ................... H04L 43/026
(Continued)

OTHER PUBLICATIONS

PCT International Search Report and Written Opinion dated Aug. 22, 2018 for International Application No. PCT/EP2018/068549, 12 pages.
(Continued)

*Primary Examiner* — Gerald A Smarth
(74) *Attorney, Agent, or Firm* — Sage Patent Group

(57) ABSTRACT

A method is disclosed for providing a Packet Flow Descriptor, PFD, to a session management function, SMF, in a telecommunication network that supports network slicing and that includes a Packet Flow Description Function, PFDF, for hiding a topology of the telecommunication network from Application Service Providers, ASP, where the PFDF is shared among slices of the telecommunication network. The method includes receiving a PFD from an ASP, and storing the PFD in a Unified Data Repository, UDR. The method further includes receiving, from the SMF, a request for PFDs that apply to a particular slice, retrieving, from the UDR, the PFD that applies to the particular slice, and providing the retrieved PFD to the SMF.

10 Claims, 5 Drawing Sheets

(51) Int. Cl.
*H04W 76/12* (2018.01)
*H04L 12/14* (2006.01)
*H04L 67/14* (2022.01)
*H04W 48/18* (2009.01)

(56) References Cited

U.S. PATENT DOCUMENTS

2019/0254083 A1* 8/2019 Stammers ............. H04W 76/10
2019/0261260 A1* 8/2019 Dao ................. H04W 36/0011

OTHER PUBLICATIONS

3GPP TS 23.503 V15.1.0, Technical Specification Group Services and System Aspects, "Policy and Charging Control Framework for the 5G System Stage 2 (Release 15)", Valbonne, France, Mar. 2018, 65 pages.
3GPP TS 23.501 V15.0.0, Technical Specification Group Services and System Aspects, "System Architecture for the 5G System Stage 2 (Release 15)," Valbonne, France, Dec. 2017, 181 pages.

* cited by examiner

METHOD OF PROVIDING NETWORK SLICE PACKET FLOW DESCRIPTORS TO A SESSION MANAGEMENT FUNCTION IN A TELECOMMUNICATION NETWORK

CROSS-REFERENCE TO RELATED APPLICATIONS

This application is a 35 U.S.C. § 371 national stage application for International Application No. PCT/EP2018/068549, entitled "A METHOD OF PROVIDING THE NETWORK SLICE PACKET FLOW DESCRIPTORS, PFDS, TO A SESSION MANAGEMENT FUNCTION, SMF, IN A TELECOMMUNICATION NETWORK", filed on Jul. 9, 2018, which claims priority to EP Application No. EP18382254.3, filed on Apr. 16, 2018, the disclosures and contents of which are hereby incorporated by reference in their entireties.

TECHNICAL FIELD

The present disclosure relates to Packet Flow Descriptors and, more specifically, to a method of providing the Network Slice Packet Flow Descriptors to a session management function in a telecommunication network.

BACKGROUND

The present disclosure is directed to the feature of network slicing. Network slicing is described, for example, in the third Generation Partnership Project, 3GPP, 5G Release 15. Network slicing enables the operator to create networks customized to provide optimized solutions for different market scenarios which demand diverse requirement, e.g. in the areas of functionality, performance and isolation.

In 5G, the network transforms and operators, instead of having a unique network that fits all needs, have multiple logical network partitions, or slices, each of them to fit a business purpose. A network slice is complete in the context of that business purpose, or "end-to-end", i.e. they are and behave like a network of its own, including all the required capabilities and resources.

Network slicing is described, on its architecture aspects, in 23.501 v 15.0.0, mostly under Chapter 15.5. The detailed procedures and services involved are specified in TS 23.502 v 15.0.0. The service/protocol specifics are being defined right now in 3GPP.

Currently, two main concepts may be important for network slicing. They are Single Network Slice Selection Assistance Information, i.e. the S-NSSAI, and the Network Slice Selection Policies, NSSPs.

The S-NSSAI identifies a Network Slice. It is comprised of a Slice/Service type, SST, which refers to the expected Network Slice behaviour in terms of features and services, and a Slice Differentiator, SD, which is optional information that complements the Slice/Service type(s) to differentiate amongst multiple Network Slices of the same Slice/Service type.

The NSSPs are policies in the UE provisioned by the network operator, i.e. the HPLMN. The NSSPs include one or more NSSP rules each one associating an application with a certain S-NSSAI. By means of these policies, the UE is able to derive the S-NSSAI it should provide to the network in the Session Establishment Requests.

A part of Network Slice selection is to select the Network functions that should serve a User Equipment, UE, connectivity request. According to the specification of Slicing in TS 23.501, as part of the UE Registration procedure, the UE receives the list of S-NSSAIs that it can use for PDU Sessions, which is typically called "Allowed NSSAI". NSSPs in the UE are for the UE to know which S-NSSAI from the "Allowed NSSAI" is to be used for certain Applications. The UE should include that S-NSSAI in the PDU Session Establishment Request. However, nothing precludes that a misbehaving UE may send, for a certain application, a PDU Session Establishment Request with a S-NSSAI that is not the one in the NSSP. Or that, a misconfigured UE may request the wrong S-NSSAI for certain Applications. The network may not detect those cases if the requested S-NSSAI is included in the Allowed NSSAI.

As a result, the traffic of certain applications could be served by the wrong Network slice and that might break the slice isolation and lead to network inefficiencies.

Slice Observability intends to detect the traffic that is being served in the wrong Network slice. Such detection is the first step to be able to take corrective actions.

Slice Analytics intends to provide information on how the slice is being used, and that can include which % of user traffic corresponds to each application.

SUMMARY

It is an object of the present disclosure to provide for a method of providing a Packet Flow Descriptor, PFD, to a session management function, SMF, in a telecommunication network.

It is another object to provide for a Packet Flow Description Function, PFDF, arranged for providing the SMF in the telecommunication network with a Packet Flow Descriptor.

A further object relates to a network exposure function, NEF, comprising the Packet Flow Description Function.

In a first aspect, there is provided a method of providing a Packet Flow Descriptor, PFD, to a session management function, SMF, in a telecommunication network, wherein said telecommunication network is able to support network slicing, wherein said telecommunication network comprises a Packet Flow Description Function, PFDF, arranged for controlling PFDs, and wherein said PFDF is shared among slices of said telecommunication network The method comprises the steps of:
receiving, by said PFDF, from an Application Service Provider, ASP, a PFD;
storing, by said PFDF, said PFD in a Unified Data Repository, UDR, comprised by said telecommunication network;
receiving, by said PFDF, from a Session Management Function, SMF, a request for PFDs that apply to a particular slice;
retrieving, by said PFDF, from said UDR said PFD that applies to said particular slice;
providing, by said PFDF, said retrieved PFD to said SMF.

As explained above, slice observability is advantageous to detect traffic flows that, in certain situations, might have been placed on a wrong slice. U User Plane Function, UPF, is typically specific to a slice and may have visibility of the traffic. If the UPF knows the PFDs which are valid for the slice, it can detect when a slice is being misused.

Also, if the UPF knows the PFDs which are relevant for the slice, it can provide information to be used for Slice Analytics, e.g. to derive the % of traffic of each type, i.e. each PFD, being served by the slice.

However, the Applications and how to detect that Application traffic, i.e. PFD, will in many cases be provided dynamically by the ASPs via PFD Management procedures.

There are a number of limitations with current PFD Management solutions.

The T8 interface allows ASPs to request certain Quality of Service, QoS, or charging conditions for certain services. T8 PFD management allows the ASP to provide the information to assist to classify the traffic of those services/flows, i.e. the PFDs.

Most probably because Policy and Charging Control, PCC, was the main use case, the Session Management Function, SMF, or Packet Gateway, PGW-C, to PFDF interaction for the retrieval of PFDs is assumed to be tied to the PCCs. When SMF/PGW-C receives a PCC with a certain application identification that triggers in SMF/PGW-C, it requests the corresponding PFD if not yet available. Actually, both pull and a push mode for PFDs retrieval require as input the application identification. This means that the SMF/PGW-U need to know the relevant application beforehand. That is not an issue if the purpose is to enforce certain PCCs as that information is available from the Policy Control Function, PCF, or the Policy and Charging Rules Function, PCRF. This may be an issue for other use cases.

User Plane boxes may perform traffic inspection, analysis and classification with other purpose than PCC enforcement, like for example, observability or analytics, and in that case, there is no related PCC, but the applicable PFDs are still needed.

Some example use cases are:
The ASP states which applications are to be served under certain connectivity Service Level Agreement, SLA. Operators might decide to serve the traffic for those applications under that SLA using certain slice, identified by an S-NSSAI:
NSSPs will be updated with the Applications-S-NSSAI mapping to be used for slice selection;
PFDs for the applications may be provided by the ASP. Operator can decide to perform slicer observability: i.e. guarantee the slice purpose is kept
If the ASP wants analytics on the usage of these Applications:
PFDs for the applications if provided by the ASP can be used to obtain usage reports for each application separately.

To summarize, there are a number of use cases that can benefit of the PFD information. However, SMF/PGW-C cannot be assumed to know the application identification beforehand and use it as key to build the PFD request. In addition, to assume that NEF/PFDF knows e.g. by means of configuration which PFDs are relevant to which SMFs/PGW-Cs is not realistic. 3GPP has defined an NF Repository Function, NRF, as the function to discover the Network Functions, NFs, that satisfy certain conditions, and NRF services should be used instead.

The method according to the present disclosure enables an NEF/PFDF to provide, to the SMF on request, i.e. pull mode, all PFDs that apply to certain slice(s). For that, it may either store the received PFDs with the corresponding applicable Slice(s) in the UDR, so the slice(s) can be used as input in the data request from the PFDF functionality to the Unified Data Repository, UDR, or it may store the PFDs in the UDR without slicing information. In this second case, the PFDF functionality may first obtain the list of applications that apply to a specific slice, e.g. with assistance of PCF that may need that knowledge for the NSSPs, and may use then the application identifications as the input in the data request from the PFDF functionality to UDR.

The above described solution allowed to extend the usage of PFDs beyond PCC and provides other types of use cases, like slice observability and slice analytics including also PFD information provided by ASPs, and information available in the SLAs.

In an example, the step of storing comprises:
storing, by said PFDF, said PFD with identifications of corresponding applicable slices in said UDR.

In a further example, the received request from said SMF comprises an identification of said particular slice, and wherein said step of retrieving comprises:
retrieving, by said PFDF, from said UDR said PFD that applies to said particular slice by using said received identification of said particular slice.

In another example, PFD comprises an application identification for identifying an application corresponding to said PFD, wherein said step of retrieving said PFD from said UDR comprises:
obtaining, by said PFDF, from a Policy Control Function, PCF, one or more application identifications that apply to said particular slice, and
retrieving, by said PFDF, from said UDR said PFD that applies to said particular slice by using said received one or more application identifications.

Typically, the PFD is a set of information enabling the detection of application traffic on the user plane when traffic is encrypted, including:
A PFD identification, PFD id, and
A 3-tuple including protocol, server-side IP address and port number, and/or
The significant parts of the URL to be matched, e.g. host name, and/or
A Domain name matching criteria.

In a further example, the method further comprises the step of:
storing, by said PFDF, locally or in in said UDR, authorization information corresponding to agreements between said telecommunication network and said ASPs and/or to slices,
and wherein said step of retrieving further comprises:
authorizing, by said PFDF, said received request by using said stored authorization information.

In another example, the PFDF is comprised in a network exposure function, NEF.

In a second aspect of the present disclosure, there is provided a A Packet Flow Description Function, PFDF, arranged for providing a Packet Flow Descriptor, PFD, to a session management function, SMF, in a telecommunication network, wherein said telecommunication network is able to support network slicing, wherein PFDF is arranged for controlling PFDs, wherein said PFDF is arranged to be shared among slices of said telecommunication network, wherein said PFDF comprises:
receive equipment arranged for receiving from an Application Service Provider, ASP, a PFD;
store equipment arranged for storing said PFD in a Unified Data Repository, UDR, comprised by said telecommunication network;
wherein said receive equipment is further arranged for receiving from a Session Management Function, SMF, a request for PFDs that apply to a particular slice;
wherein said PFDF further comprises:
retrieve equipment arranged for retrieving from said UDR said PFD that applies to said particular slice, and
provide equipment arranged for providing said retrieved PFD to said SMF.

The advantages of the first aspect of the disclosure are also inherently a part of the second aspect of the disclosure. Furthermore, it is pointed out that although the claims read as if all the equipment according to the present disclosure are incorporated into a single node, a person skilled in the art understands that the same disclosure may be implemented by distributing the equipment over several nodes, for example like a cloud based solution.

In accordance with the present disclosure, equipment may also be interpreted as a module, device, means or anything alike.

In an example, the store equipment is further arranged for storing, by said PFDF, said PFD with identifications of corresponding applicable slices in said UDR.

In a further example, the received request from said SMF comprises an identification of said particular slice, and wherein said retrieve equipment is further arranged for retrieving from said UDR said PFD that applies to said particular slice by using said received identification of said particular slice.

In another example, the PFD comprises an application identification for identifying an application corresponding to said PFD, wherein said retrieve equipment is further arranged for:
- obtaining from a Policy Control Function, PCF, one or more application identifications that apply to said particular slice, and
- retrieving from said UDR said PFD that applies to said particular slice by using said received one or more application identifications.

In yet another example, the store equipment is further arranged for storing, in said UDR, authorization information corresponding to agreements between said telecommunication network and said ASPs and/or to slices, and wherein said retrieve equipment is further arranged for authorizing said received request by using said stored authorization information.

In a third aspect of the present disclosure, there is provided a network exposure function, NEF, arranged for operating in a telecommunication network, wherein said NEF comprises a PFDF according to any of the examples as provided above.

In a fourth aspect of the present disclosure, there is provided a computer program product containing computer program code which, when executed by a Packet Flow Description Function, PFDF, cause the PFDF to implement the method according to any of the examples as provided above.

The above-mentioned and other features and advantages of the disclosure will be best understood from the following description referring to the attached drawings. In the drawings, like reference numerals denote identical parts or parts performing an identical or comparable function or operation.

DETAILED DESCRIPTION

Figure 1:
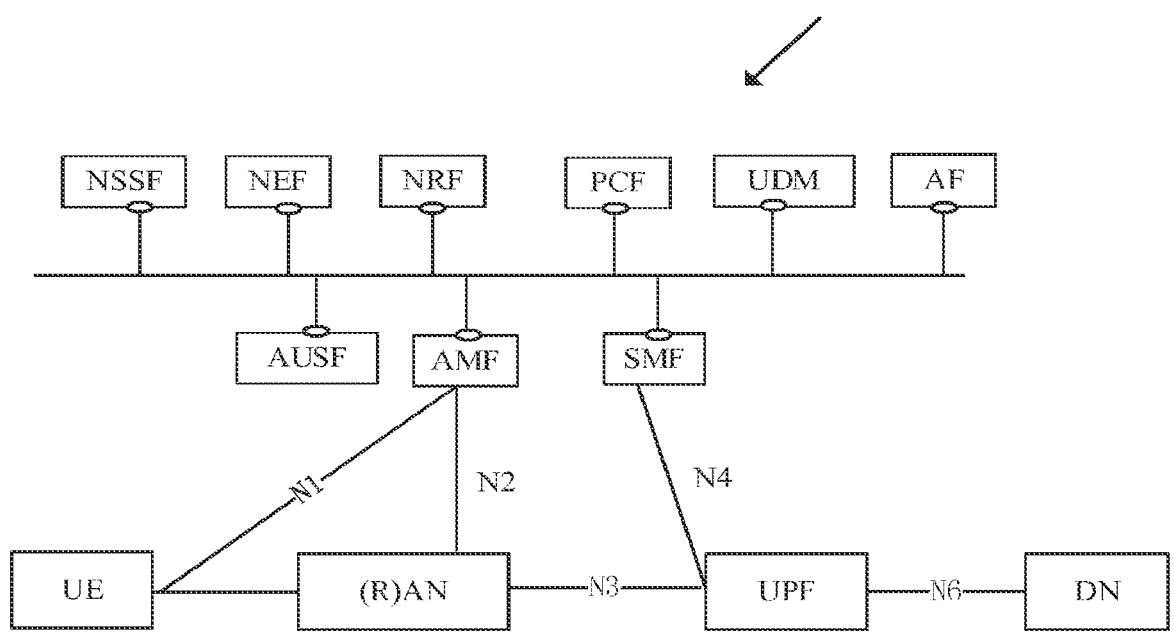
FIG. 1 shows an example of a 5$^{th}$ Generation, 5G, network architecture, non-roaming situation.

FIG. 1 shows an example of a 5$^{th}$ Generation, 5G, network architecture, non-roaming situation.

As mentioned before, the present disclosure is directed to the concept of network slicing, which is, amongst other, described in Technical Specification, TS, 23.501.

Clause 5.15.1 specifies that the operator may deploy multiple Network Slice instances to e.g. deliver a different committed service and/or because they may be dedicated to a customer. It introduces that the selection of a network slice for a User Equipment, UE, is triggered by the first contacted AMF and carried out, optionally, together with the Network Slice Selection Function, NSSF, at UE registration. It also states that a single UE can simultaneously be served by one or more Network Slice instances.

Clause 5.15.2 describes the identifiers, i.e. S-NSSAIs/NSSAIs, used by the UE and the 5G Core in order for the 5G System to be able to allocate a UE to the Network Slice, and to the network slice instance, that fulfils the service characteristics the UE is requesting. It also defines the S-NSSAI standard values.

Clause 5.15.3 describes the UE's subscription aspects related to S-NSSAIs, i.e. UDM configuration and associated behaviour, and clause 5.15.4 describes the UE's configuration aspects for NSSAI/S-NSSAIs.

Clause 5.15.5 deals with the detailed procedure for the selection of a serving AMF that supports the UE requested network slices. This procedure covers UE registration, to a set of network slices, modification of the Set of Network Slices(s) allocated to a UE and the AMF relocation. This chapter, also covers connectivity aspects to a network slice, as establishment of connectivity and privacy. NSSPs play a key role in PDU session establishment. A PDU Session belongs to one and only one specific Network Slice instance per PLMN. Different Network Slice instances do not share a PDU Session.

Finally, clause 5.15.6 covers Network Slicing support for roaming.

A part of Network Slice selection is to select the NFs that should serve a UE connectivity request. According to the specification of Slicing in TS 23.501, as part of the UE Registration procedure, the UE receives the list of S-NSSAIs that it can use for PDU Sessions, that is typically called the "Allowed NSSAI". As explained in the background, the NSSPs in the UE are for the UE to know which S-NSSAI from the "Allowed NSSAI" is to be used for certain Application. The UE should include that S-NSSAI in the PDU Session Establishment Request. However, nothing precludes that:
- A misbehaving UE sends for certain Application a PDU Session Establishment Request with a S-NSSAI that is not the one in the NSSP (the network will not detect that if that S-NSSAI is from the Allowed NSSAI).
- A misconfigured UE requests the wrong S-NSSAI for certain Application if that is included in the Allowed NSSAI.

As a result, the traffic of certain applications could be served by the wrong Network slice and that might break the slice isolation and lead to network inefficiencies.

The 3GPP standard has defined a new system architecture for the next generation mobile networks that will be the next phase of mobile telecommunication standards beyond the current 4G. This architecture has been specified in 3GPP TS 23.501, and is shown in FIG. 1 as indicated with reference numeral 1.

Having Service based interfaces in the control plane implies that the NFs interaction is done by means of services: the NFs in the 5G CP provide services that are consumed by other NFs in the 5G CP.

The roles of these entities and the interfaces have been defined in the 3GPP T 23.501. The network functions that may be of interest for the present disclosure are the following.

The Policy Control Function, PCF, supports unified policy framework to govern the network behaviour. It also implements a Front End, i.e. PCF FE, to access subscription information relevant for policy decisions in a Unified Data Repository, UDR. The PCF may provide Policy and Charging Control, PCC, to the PCEF, i.e. SMF/UPF that enforces policy and charging decisions according to the PCCs. In 5G, the PCF may also store and provide to the UE the NSSPs that are used to assist network slice selection.

The Session Management Function, SMF, is responsible for Session establishment, modification and release, including selection and control of the UPF entities. SMF can provide to UPF information in terms of PFDs (Packet Flow Descriptors) obtained e.g. from the NEF, for the service classification of the user IP data. SMF interacts with the UPF over N4 Reference point using PFCP procedures.

The User Plane Function, UPF, may handle the user data traffic and optionally includes DPI functionality. DPI, i.e. Deep Packet Inspection, technology comprises inspecting/analysing the contents of the IP data packets beyond the—so called—IP 5 tuples. The so-called IP 5 tuples consist on the heading elements of an IP data packet comprising: IP source address, IP destination address, source transport address, destination transport address, and protocol over IP (e.g. TCP, UDP). Therefore, put in short terms, DPI technology consists in inspecting and analyzing the application layer information conveyed by IP data packets. As a result of the DPI analysis, it can be obtained service classification information, which consists on IP packets being classified—i.e. after DPI processing—according to a configured tree of rules so that they are assigned to a particular service session or application.

The Network Exposure Function, NEF, may translate between information exchanged with the external AF and information exchanged with the internal network function/s. It is the Operator Network entry point for ASPs (application Service Providers). From 3GPP R.15 is includes the PFDF (Packet Flow Descriptor Function) which is intended to manage the PFDs (Packet Flow Descriptors) provided by ASPs and distribute them to the SMFs. In 3GPP 4G, PFDF had been a NF on its own and had stored the PFDs.

The Unified Data Repository, UDR, provides Storage and retrieval of subscription data by the UDM (the evolution of HSS in 5G Architecture), Storage and retrieval of policy data by the PCF and Storage and retrieval of structured data for exposure, and application data (including Packet Flow Descriptions (PFDs) for application detection, application request information for multiple UEs, by the NEF.

The Network Functions (NFs) can be slice specific (i.e. not shared by more than one slice), they can be shared by some network slices or they can be fully across slices. SMF and UPF are typically slice specific whereas NSSF is foreseen to be across-slices. Isolation requirements play an important role on how the slices are designed and deployed.

Figure 2:
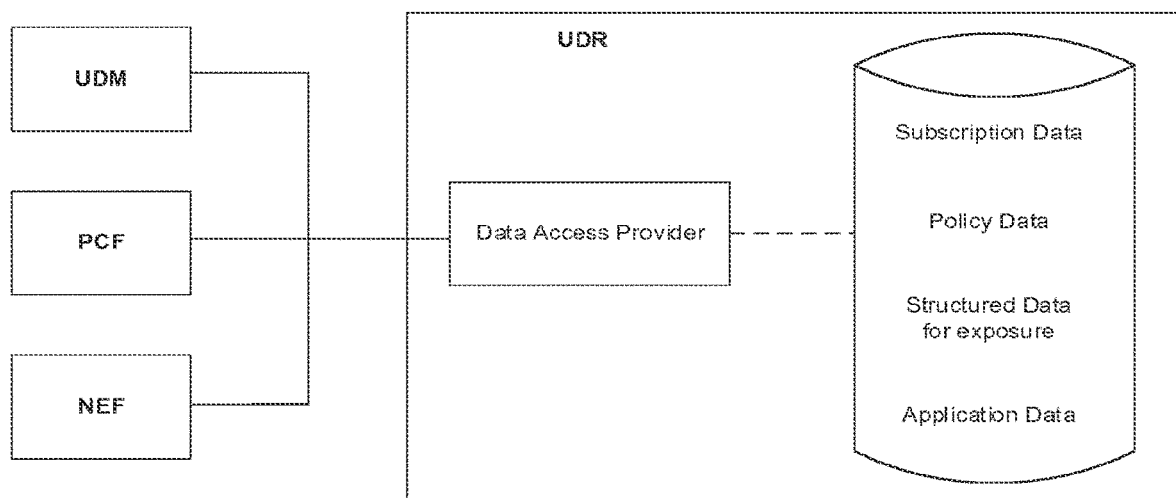
FIG. 2 shows an example of a 5G data storage architecture.

FIG. 2 shows the 5G data storage architecture as explained above.

The present disclosure is directed to a solution for management of Packet Flow Descriptors, PFDs, provided by ASPs, Application Service Providers. This solution may include the definition of a new Network Function, Packet Flow Description Function, PFDF. With this solution, operators get from ASPs the PFDs to classify the user traffic and for example, apply zero charging to the flows that will be sponsored by the ASP.

Packet Flow Description, PFD, is a set of information enabling the detection of application traffic on the user plane when traffic is encrypted, including:
PFD id; and
a 3-tuple including protocol, server-side IP address and port number; or
the significant parts of the URL to be matched, e.g. host name; or
a Domain name matching criteria.

3GPP TS 23.203 described how the PFDF provisions PFDs for the corresponding application identifier to the PGW-C (4G).

Figure 3:
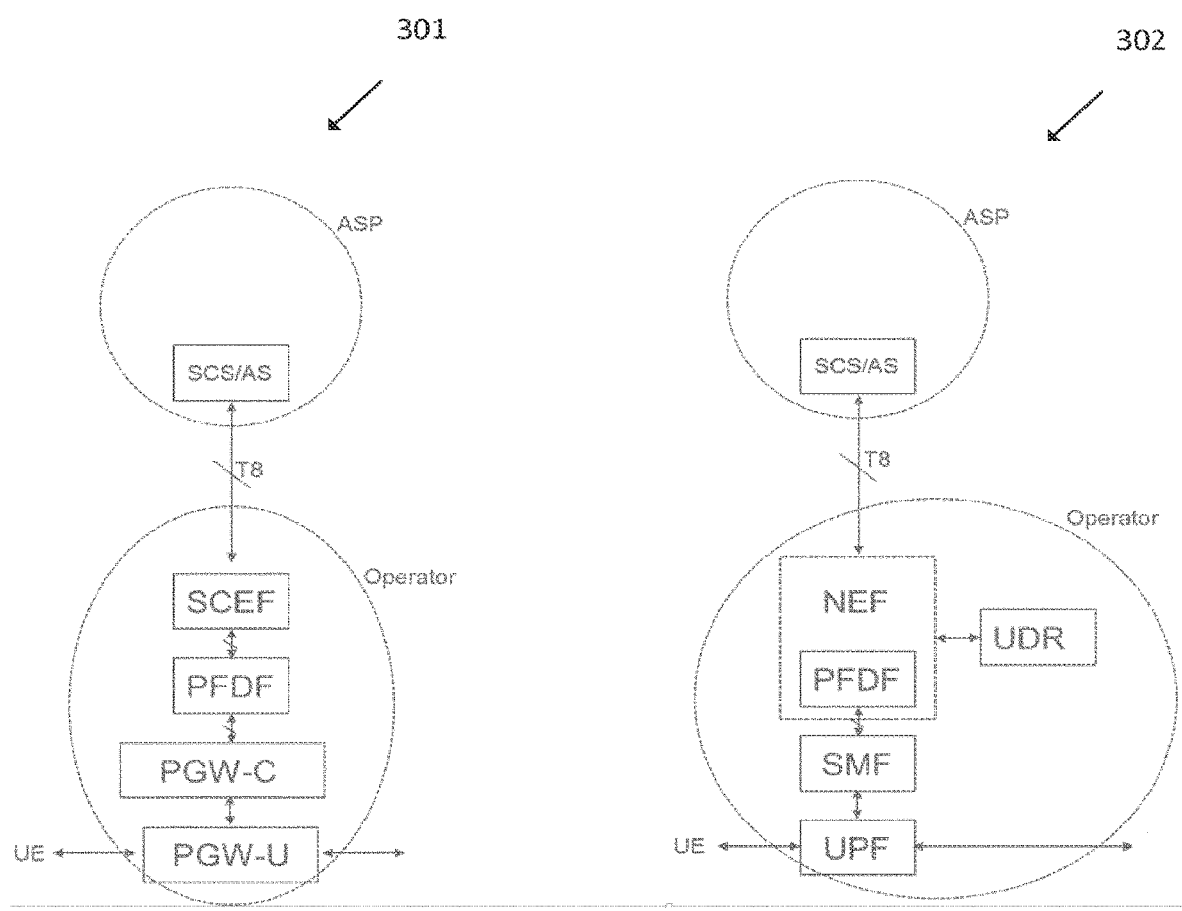
FIG. 3 shows an example of a 4G and a 5G architecture for PFD management.

FIG. 3 shows an example of a 4G, i.e. reference numeral 301, and a 5G, i.e. reference numeral 302, architecture for PFD management.

Whereas in 4G the PFDF is a standalone function, in 5G it may be integrated in the NEF. Whereas in 4G the PFDF stores itself the PFDs, in 5G that storage may be delegated to UDR.

But in the solution for both 3GPP Generations, SMF/PGW-C may retrieve the PFDs from NEF/PFDF and provides them to UPF.

TS 23.501 in Chapter 6.2.5 describes the role of NEF. It states among other the following:

"NEF translates between information exchanged with the AF and information exchanged with the internal network function. For example, it translates between an AF-Service-Identifier and internal 5G Core information such as DNN, S-NSSAI" That is, it hides the network slicing to ASPs.

"The PFD Function in the NEF may store and retrieve PFD(s) in the UDR and shall provide PFD(s) to the SMF on the request of SMF (pull mode) or on the request of PFD management from NEF (push mode)"

TS 23.503 chapter 6.1.2.3 describes PFD Management in more detail:

"The ASP manages (provision, update, delete) the PFDs through the NEF. The PFD(s) are transferred to the SMF through the PFDF. The PFDF is a logical functionality which receives PFD(s) from the ASP through the NEF, stores the PFD(s) in the UDR and provides the PFD(s) to the SMF(s) either on the request from ASP PFD management through NEF (push mode) or on the request from SMF (pull mode) . . . "

"When the "pull" mode is used, at the time a PCC Rule with an application identifier for which PFDs are not available is activated or provisioned, the SMF requests all PFDs for that application identifier from the PFDF, and PFDF retrieves them from the UDR. The PFD(s) retrieved for an application identifier from the PFDF are cached in the SMF"

"When the "push" mode is used, the PFDF retrieves from the UDR the PFDs for each application identifier and distributes them to those SMFs that enable access to those applications. The PFDF may be configured with the list of SMFs where PFD(s) should be distributed".

And TS 23.503 Chapter 5.9.1 specifies for SMF-NEF interactions:

" . . . The interactions between the SMF and the NEF for transporting PFDs are not related to any PDU Session".

That is, the information obtained can in principle be used for any user and session that requires it.

One conclusion from analysis of the services operations is that they all have been standardized to require as input the application identifier(s).

The PFDs are typically provided by the SMF to the UPF over the N4 interface. Though N4 is not yet specified, agreement at this point is that it will be based on Sx, and so there will be two ways to provide the PFDs to the UPF:

Using N4 PFD management procedures.

As part of the N4 PDRs, and so tied to a user session and a specific enforcement.

As explained before, Slice Observability may be advantageous to detect the traffic flows, that in certain situations, might have been placed on the wrong slice. The UPF is specific to the slice and has visibility of the traffic. If UPF knows the PFDs which are valid for the slice, it can detect when a slice is being misused.

Also, if UPF knows the PFDs which are relevant for the slice, it can provide information to be used for Slice Analytics, e.g. to derive the % of traffic of each type, i.e. each PFD, being served by the slice.

However, the Applications and how to detect that Application traffic, PFD, will in many cases be provided dynamically by the ASPs via PFD Management procedures.

There are a number of limitations with current PFD Management solutions.

The T8 interface allows ASPs to request certain QoS or charging conditions for certain services. T8 PFD management allows the ASP to provide the information to assist to classify the traffic of those services/flows (i.e. the PFDs).

Most probably because PCC was the main use case, the SMF/PGW-C to NEF/PFDF interaction for the retrieval of PFDs is assumed to be tied to the PCCs: when SMF/PGW-C receives a PCC with certain App Id that triggers in SMF/PGW-C it requests the corresponding PFD if not yet available. Actually, both pull and a push mode for PFDs retrieval require as input the Application Id. Which means the SMF/PGW-U need to know the relevant Applications beforehand. That is not an issue if the purpose is to enforce certain PCCs (that information is available from PCF/PCRF). But it is an issue for other use cases.

User Plane boxes may perform traffic inspection, analysis and classification with other purpose than PCC enforcement, like for example, observability or analytics, and in that case, there is no related PCC, but the PFDs are still needed. Some example use cases are:

The ASP states which applications are to be served under certain connectivity Service Level Agreement, SLA. Operators might decide to serve the traffic for those applications under that SLA using certain slice, identified by an S-NSSAI:

NSSPs will be updated with the Applications-S-NSSAI mapping to be used for slice selection;

PFDs for the applications may be provided by the ASP. Operator can decide to perform slicer observability: i.e. guarantee the slice purpose is kept If the ASP wants analytics on the usage of these Applications:

PFDs for the applications if provided by the ASP can be used to obtain usage reports for each application separately.

To summarize, there are a number of use cases that can benefit of the PFD information. However, SMF/PGW-C cannot be assumed to know the App Id beforehand and use it as key to build the PFD request.

In addition, to assume that NEF/PFDF knows e.g. by means of configuration which PFDs are relevant to which SMFs/PGW-Cs is not realistic. 3GPP has defined NRF as the function to discover the NFs that satisfy certain conditions, and NRF services should be used instead.

As part of the present disclosure, the following.

There may be an NEF in the operator network which includes PFDF functionality and supports the T8 procedures for PFD Management. Using T8, one or more ASPs provide information about the PFDs which describe the traffic for their Applications.

This NEF may be shared across the operator slices and, among other functions, it hides the operator network topology from the ASPs. Based on the T8 request input and request specifics (e.g. origin ASP) and on the NEF own knowledge of the Operator network topology and the Operator SLAs with the ASPs, the NEF is able to convey the information received over T8 to the relevant NF(s), When an ASP provides PFD information over T8, the NEF stores it in the UDR.

This NEF, i.e. the PFDF functionality, may be able to provide to SMF on request, i.e. pull mode, PFDs that apply to certain slice(s). For that, it either stores the received PFDs with the corresponding applicable Slice(s) in the UDR (so the slice(s) can be used as input in the data request from NEF to UDR), or it only stores the PFDs in the UDR, In this second case, the NEF obtains first the list of applications that apply to an slice (e.g. with assistance of PCF that may have that knowledge for the NSSPs) and uses then the Application Id(s) as the input in the data request from NEF to UDR.

This NEF can store information about whether observability and/or analytics apply to the agreement between the operator and certain ASP and/or to certain network slice(s) and uses that to authorize the SMF requests.

The operator can use NEF(PFDF) to store other PFD information in UDR when relevant to be used for slice observability or analytics by other means (e.g. through OAM).

Figure 4:
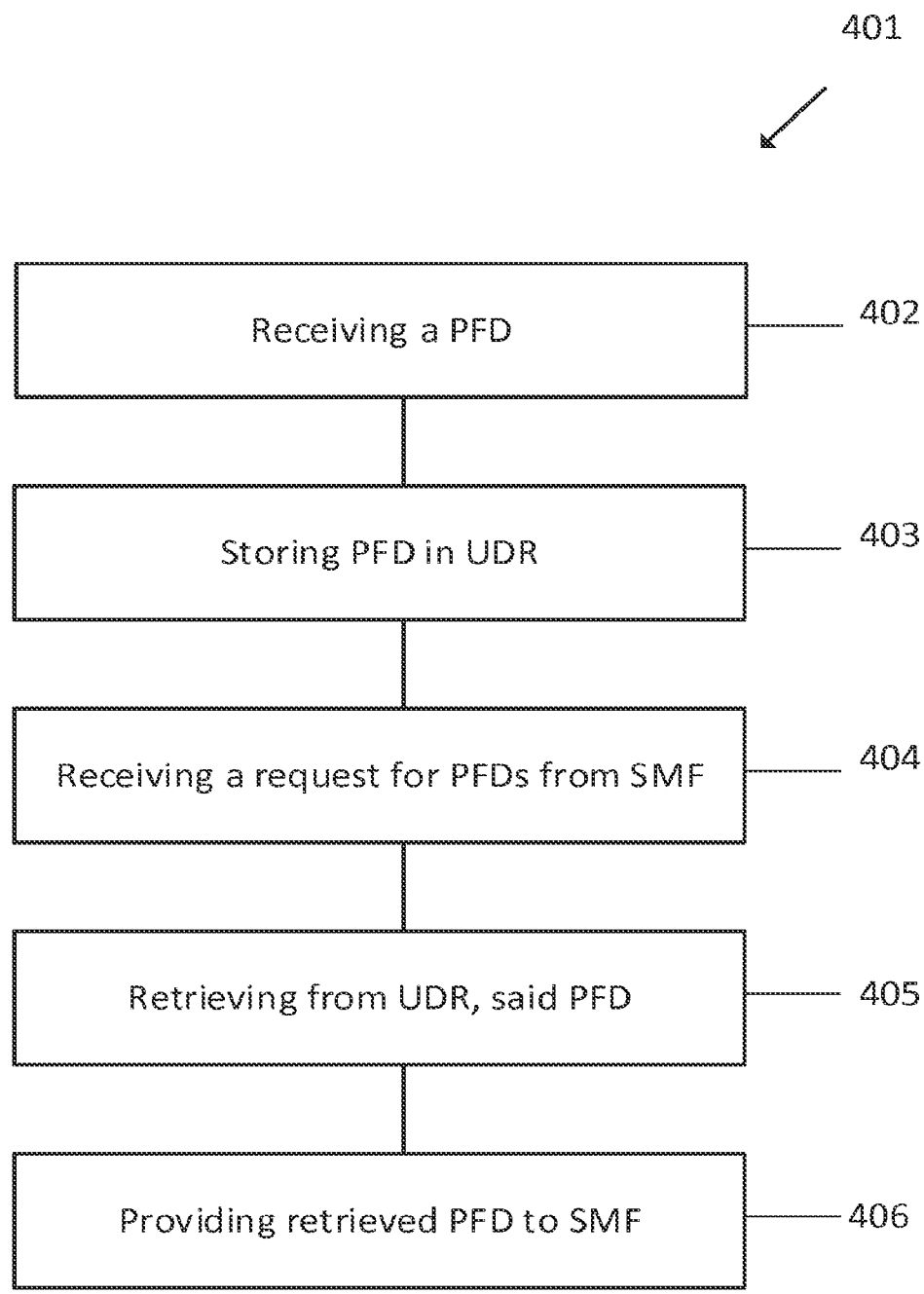
FIG. 4 shows an example of a flow chart in accordance with the present disclosure.

FIG. 4 shows an example of a flow chart in accordance with the present disclosure.

The flow chart discloses a method 401 of providing a Packet Flow Descriptor, PFD, to a session management function, SMF, in a telecommunication network, wherein said telecommunication network is able to support network slicing, wherein said telecommunication network comprises a Packet Flow Description Function, PFDF, arranged for hiding a topology of said telecommunication network from Application Service Providers, ASPs, and wherein said PFDF is shared among slices of said telecommunication network.

The method 401 comprises the steps of:

receiving 402, by said PFDF, from an ASP, a PFD;

storing 403, by said PFDF, said PFD in a Unified Data Repository, UDR, comprised by said telecommunication network;

receiving 404, by said PFDF, from a Session Management Function, SMF, a request for PFDs that apply to a particular slice;

retrieving 405, by said PFDF, from said UDR said PFD that applies to said particular slice;

providing 406, by said PFDF, said retrieved PFD to said SMF.

Figure 5:
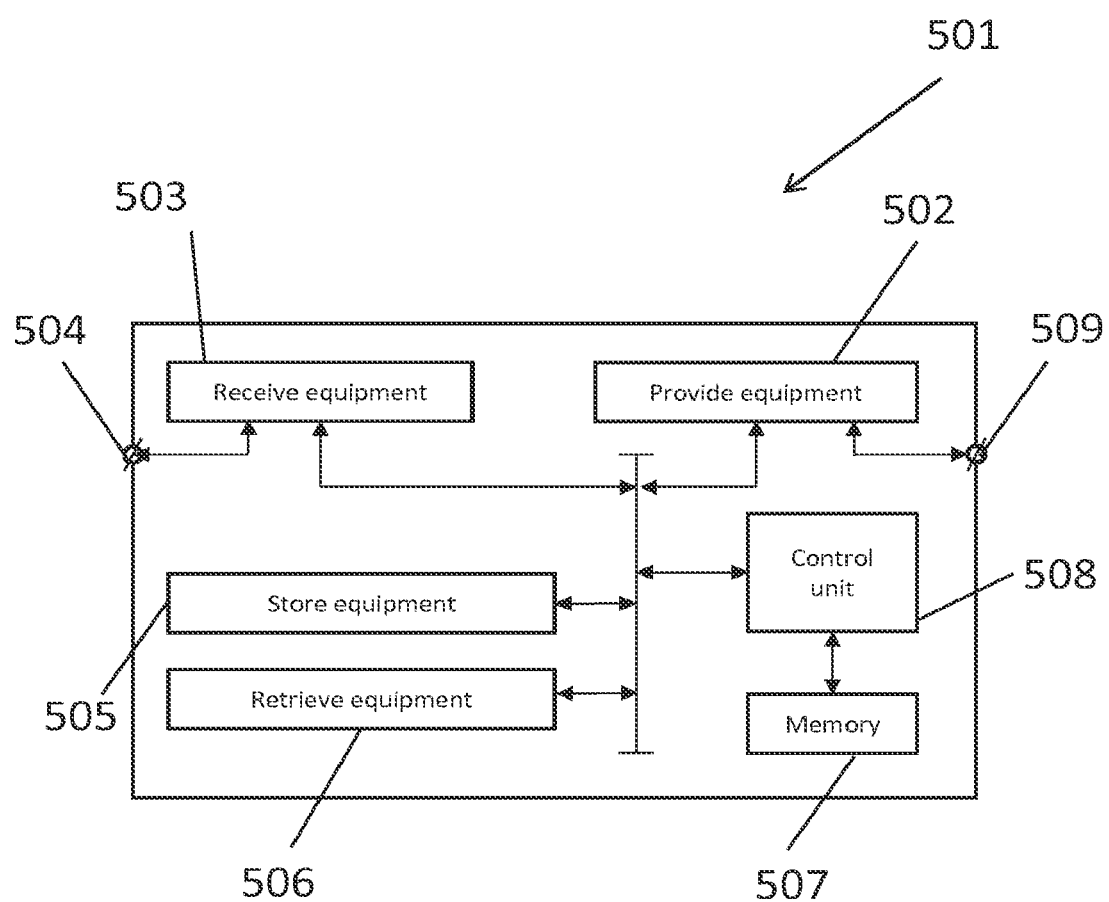
FIG. 5 shows an example of a Packet Flow Descriptor, PFD, in accordance with the present disclosure.

FIG. 5 shows an example of a Packet Flow Descriptor Function, PFDF, in accordance with the present disclosure.

The Packet Flow Description Function, PFDF, 501 is arranged for providing a Packet Flow Descriptor, PFD, to a session management function, SMF, in a telecommunication network, wherein said telecommunication network is able to support network slicing, wherein PFDF is arranged for hiding a topology of said telecommunication network from Application Service Providers, ASPs, and wherein said PFDF is arranged to be shared among slices of said telecommunication network.

The PFDF 501 comprises:
receive equipment 503 arranged for receiving from an ASP, a PFD;
store equipment 505 arranged for storing said PFD in a Unified Data Repository, UDR, comprised by said telecommunication network;
wherein said receive equipment is further arranged for receiving from a Session Management Function, SMF, a request for PFDs that apply to a particular slice; wherein said PFDF further comprises:
retrieve equipment 506 arranged for retrieving from said UDR said PFD that applies to said particular slice, and
provide equipment 502 arranged for providing said retrieved PFD to said SMF.

Incoming packets are received via the input terminal 504 and the receive equipment 503. Outgoing packets are provided via the provide equipment 502 and the output terminal 509.

The PFDF 501 further comprises a control unit 508, connected to a memory 507, and wherein the receive equipment 503, the provide equipment 502, the store equipment 505 and the retrieve equipment 506 are all connected to the control unit 508 via a bus.

Other variations to the disclosed examples can be understood and effected by those skilled in the art in practicing the claimed disclosure, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not construed as limiting scope thereof.

The present disclosure is not limited to the examples as disclosed above, and can be modified and enhanced by those skilled in the art beyond the scope of the present disclosure as disclosed in the appended claims without having to apply inventive skills.

The invention claimed is:

1. A method of providing a Packet Flow Descriptor (PFD) to a session management function (SMF) in a telecommunication network, wherein said telecommunication network is able to support network slicing, wherein said telecommunication network comprises a Packet Flow Description Function (PFDF) for hiding a topology of said telecommunication network from Application Service Providers (ASPs) and wherein said PFDF is shared among slices of said telecommunication network, said method comprises the steps of:
receiving, by said PFDF, from an ASP, a PFD;
storing, by said PFDF, said PFD in a Unified Data Repository (UDR) comprised by said telecommunication network, wherein said PFD is stored with identifications of corresponding applicable slices in said UDR;
receiving, by said PFDF, from a Session Management Function (SMF) a request for PFDs that apply to a particular slice, wherein said received request comprises an identification of said particular slice;
retrieving, by said PFDF, from said UDR said PFD that applies to said particular slice; and
providing, by said PFDF, said retrieved PFD to said SMF.

2. The method according to claim 1, wherein said step of retrieving comprises:
retrieving, by said PFDF, from said UDR said PFD that applies to said particular slice by using said received identification of said particular slice.

3. The method according to claim 1, wherein said PFD comprises an application identification for identifying an application corresponding to said PFD, wherein said step of retrieving said PFD from said UDR comprises:
obtaining, by said PFDF, from a Policy Control Function (PCF) one or more application identifications that apply to said particular slice, and
retrieving, by said PFDF, from said UDR said PFD that applies to said particular slice by using said received one or more application identifications.

4. The method according to claim 1, wherein said method further comprises the step of:
storing, by said PFDF, in said UDR, authorization information corresponding to agreements between said telecommunication network and said ASPs and/or to slices, and wherein said step of retrieving further comprises:
authorizing, by said PFDF, said received request by using said stored authorization information.

5. The method according to claim 1, wherein said PFDF is comprised in a network exposure function (NEF).

6. A Packet Flow Description Function (PFDF) arranged for providing a Packet Flow Descriptor (PFD) to a session management function (SMF) in a telecommunication network, wherein said telecommunication network is able to support network slicing, wherein PFDF is arranged for hiding a topology of said telecommunication network from Application Service Providers (ASPs) and wherein said PFDF is arranged to be shared among slices of said telecommunication network, wherein said PFDF comprises:
receive equipment arranged for receiving from an ASP, a PFD;
store equipment arranged for storing said PFD in a Unified Data Repository (UDR) comprised by said telecommunication network, wherein said store equipment is further arranged for storing said PFD with identifications of corresponding applicable slices in said UDR;
wherein said receive equipment is further arranged for receiving from a Session Management Function (SMF) a request for PFDs that apply to a particular slice, wherein said received request comprises an identification of said particular slice and wherein said PFDF further comprises:
retrieve equipment arranged for retrieving from said UDR said PFD that applies to said particular slice, and
provide equipment arranged for providing said retrieved PFD to said SMF.

7. The PFDF according to claim 6, wherein said retrieve equipment is further arranged for retrieving from said UDR said PFD that applies to said particular slice by using said received identification of said particular slice.

8. The PFDF according to claim 6, wherein said PFD comprises an application identification for identifying an application corresponding to said PFD, wherein said retrieve equipment is further arranged for:
obtaining from a Policy Control Function (PCF) one or more application identifications that apply to said particular slice, and retrieving from said UDR said PFD that applies to said particular slice by using said received one or more application identifications.

9. The PFDF according to claim 6, wherein said store equipment is further arranged for storing, in said UDR, authorization information corresponding to agreements between said telecommunication network and said ASPs and/or to slices, and wherein said retrieve equipment is further arranged for authorizing said received request by using said stored authorization information.

10. A network exposure function (NEF) arranged for operating in a telecommunication network, wherein said NEF comprises a PFDF according to claim 6.

* * * * *